UNITED STATES PATENT OFFICE.

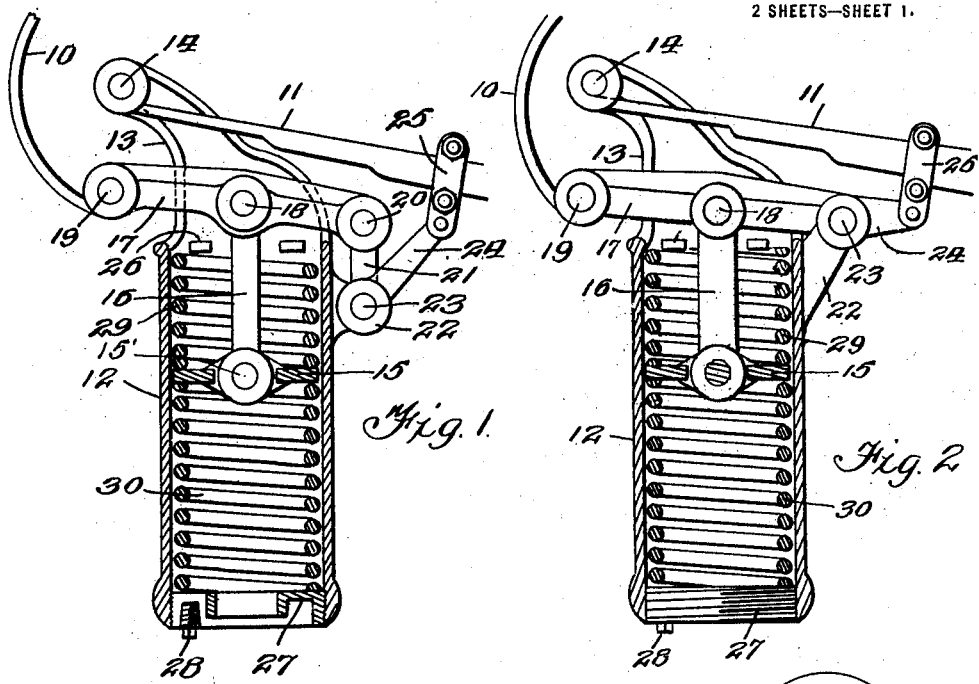
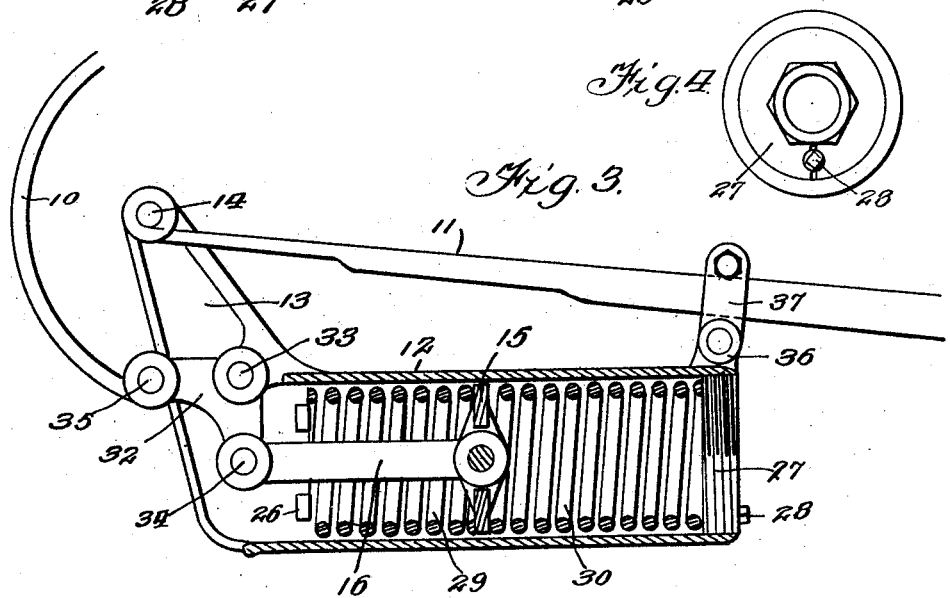

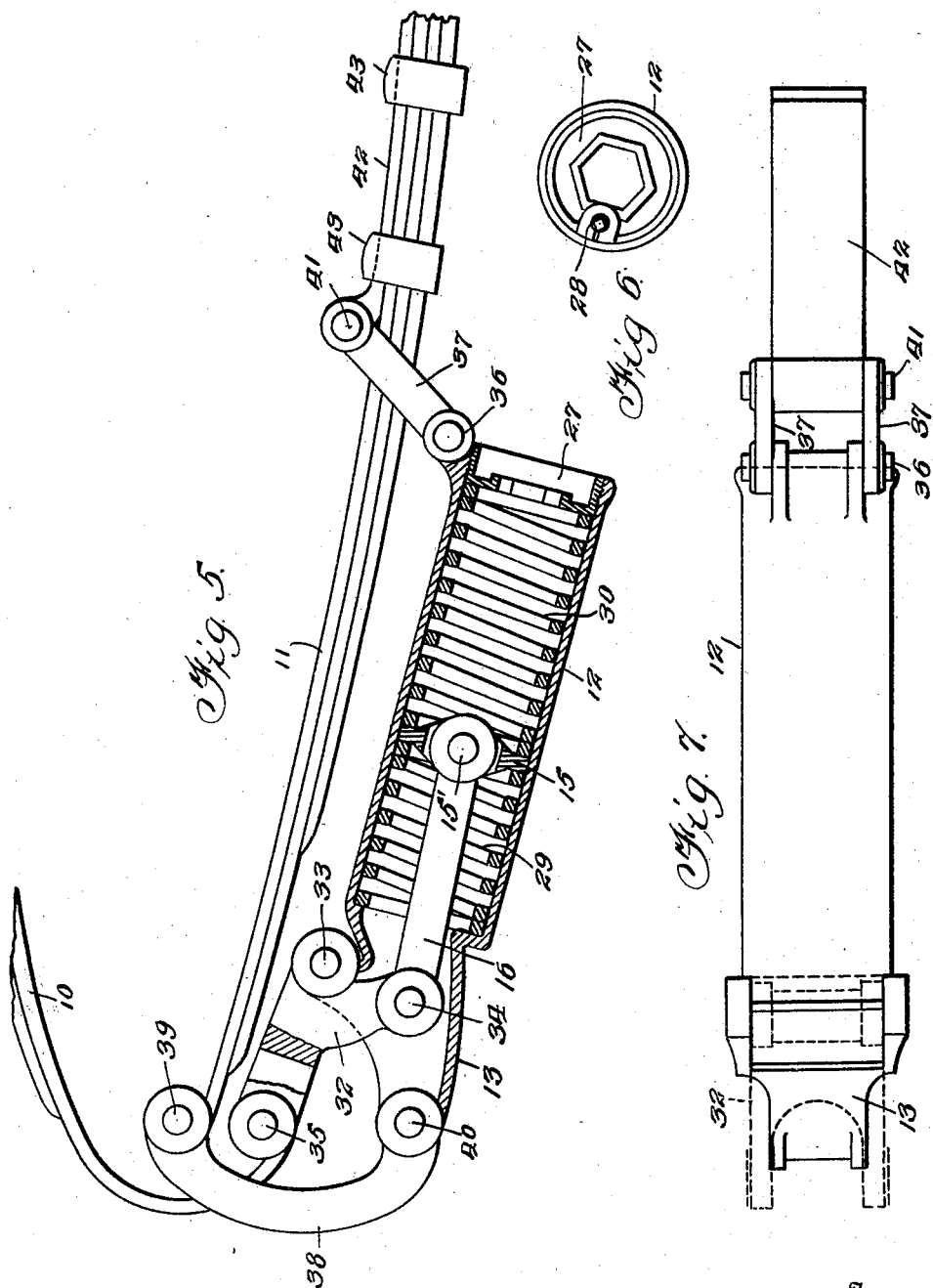

RICHARD T. NEWTON, OF NUTLEY, NEW JERSEY.

VEHICLE.

1,400,372.     Specification of Letters Patent.     Patented Dec. 13, 1921.

Application filed November 4, 1914. Serial No. 870,315.

*To all whom it may concern:*

Be it known that I, RICHARD T. NEWTON, a citizen of the United States, and resident of Nutley, in the county of Essex and State of New Jersey, have invented certain new and useful Improvements in Vehicles, of which the following is a specification.

This invention relates to springed vehicles provided with shock neutralizers and has in view the production of a vehicle that is capable of passing over rough roads without inconvenience to an occupant or injury to its working parts. Other objects will appear from the specification and claims and the drawing in which—

Figure 1 is a vertical section showing the ends of two leaf springs to which is attached a shock neutralizer.

Fig. 2 is a similar section showing a modified form of attaching the shock neutralizer.

Fig. 3 is a similar section in which the shock neutralizer is shown as occupying a substantially horizontal position.

Fig. 4 is a bottom view of the casing in Fig. 1.

Fig. 5 is a section showing two leaf springs and a shock neutralizer substantially parallel with one of the leaf springs.

Fig. 6 is an elevation of the closed end of the casing in Fig. 5, and

Fig. 7 is a top view of the shock neutralizer shown in Fig. 5.

Referring to the drawings, there is shown the ends of two leaf springs 10 and 11, a casing of a shock neutralizer 12 being attached to the spring 11 at the top of its upper part 13 by means of the hinge or bolt 14. Inside the casing 12 are located the coiled springs 29 and 30 and between them is shown the partition 15 pivotally attached by means of the hinge or bolt 15' to the rod 16 also attached to a lever 17 by means of the hinge or bolt 18. One end of the lever 17 is pivotally attached to the spring 10 by means of the hinge or bolt 19, the other end being pivotally attached to the link 21 by means of the hinge or bolt 20, the link 21 being attached to the casing 12 on the bracket 22 by means of the hinge or bolt 23. By means of this construction the lever 19 passes across the upper part of the shock neutralizer, a construction which results in great compactness and in the shortening of the lever required. To the bracket 22 is also attached the link 24 connected with the fastening element 25. It will thus appear that the casing 12 is flexibly connected with the spring 11 at two points. Above the coiled spring 29 is located a ring or a plate 26 with an opening for the rod 16. At the bottom of the casing is a screw cap 27 by means of which the tension of the coiled springs is regulated. The screw cap 27 is held securely in place by the conical screw 28, passing through a slot, 27', in the cap 27.

In the modified construction shown in Fig. 3 the casing 12 has a horizontal position. In this case the spring 10 is attached at 35 to the bell crank lever 32 having its fulcrum at 33, the other end of the lever being pivotally connected at 34 with the rod 16. This construction is of importance because thereby the flat spring acts directly on the lever 32 avoiding lost motion and dead centers, and the action is instantaneous. The fact that the fulcrum is attached to the casing simplifies the construction and makes it more compact and shortens the lever required thereby diminishing vibration. One end of the casing 12 is pivotally attached to the spring 11 at 14 and the other end is attached at 36 to the fastening element 37 firmly attached to the spring 11.

In the modified construction shown in Fig. 5 the casing 12 of the shock neutralizer is at one end flexibly attached to the leaf spring 11 by means of the link 38, hinged or pivoted at 39 and 40, and at the other end it is flexibly attached at 36 by means of the link 37 connected at 41 with the plate 42 firmly held on the leaf spring 11 by means of the clamps, 43, 43.

On account of the flexible attachment of the casing of the shock neutralizer at each point all strains are avoided, so that the mechanism operates freely. This form of attachment also placing the shock eliminator below the leaf springs has the advantage that the shock neutralizers are not in the way in the operation of the vehicle, to which they are attached, while at the same time they are protected from mechanical injury.

The advantages of the lever used are first that the movement of the elastic element in the shock eliminator may be varied at will by a proper adjustment of the arms of the lever, that a strong spring may be used and may be made sufficiently sensitive by making the arm of the lever not connected with the casing, of sufficient length. It also facilitates the construction by making it possible to place the casing back of and some distance from the springs. It also allows great movement for the leaf springs with small movement of the coiled springs which is very desirable, the load of the springs being maintained more uniform and the springs therefor more elastic.

What I claim as new is:

1. For use with a vehicle having a body part and a supporting spring therefor associated with the running gear, said body part and spring being separated at their adjacent ends, a self-contained shock neutralizer attachment adapted to be interposed between said ends when the latter are separated, and means for securing independent elements of the neutralizer to said ends respectively to operate the neutralizer on the relative vertical displacement of said ends, one of said elements comprising a casing, a neutralizer spring within the same, and the other of said elements comprising a lever pivoted to said casing and operatively associated with the neutralizer spring, said casing having means for removably attaching it beneath the supporting spring adjacent the end of the latter.

2. For use with a vehicle having a body part and a supporting spring therefor associated with the running gear, said body part and spring being separated and apertured at their adjacent ends, a self-contained shock neutralizer attachment comprising a casing jointed to one of said ends at its apertured point, a lever jointed to the other of said ends at its apertured point and also to the casing, a neutralizer spring housed within said casing and an operative connection between said lever and neutralizer spring to operate the latter on the relative vertical displacement of said ends, said casing having means for removably attaching it beneath the supporting spring adjacent the end of the latter.

3. For use with a vehicle having a body part and a leaf spring associated with the running gear, said body part and spring being separated and apertured at their adjacent ends, a self-contained shock eliminator attachment adapted to be interposed between said body and spring when separated, comprising a casing, means for securing the same to one of said parts at its apertured point, two oppositely acting neutralizer coil springs in the casing, a partition between the coil springs, a lever jointed to the other of said parts and to the casing, and means associated with said lever for actuating said partition on the relative vertical displacement of said parts, said casing having means for removably attaching it beneath the supporting spring adjacent the end of the latter.

4. For use with a vehicle having a body part and a leaf spring associated with the running gear, said body part and spring being separated and apertured at their adjacent ends, a self-contained shock eliminator attachment adapted to be interposed between said body and spring when separated, comprising a casing, means for securing the same to one of said parts at its apertured point, two oppositely acting neutralizer coil springs in the casing, a partition between the coil springs, a lever jointed to the other of said parts and to the casing, and means associated with said lever for actuating said partition on the relative vertical displacement of said parts, one of said neutralizer springs being of greater strength than the other, said casing having means for removably attaching it beneath the supporting spring adjacent the end of the latter.

5. For use with a vehicle having a body leaf spring and a main supporting leaf spring, and said springs being separated and apertured at their adjacent ends and associated with the running gear, a self-contained shock eliminator attachment adapted to be interposed between said spring ends when separated, and comprising a casing, means for securing the same to one of said springs at its apertured point, a lever jointed to the other spring at its apertured point, and a neutralizer spring within the casing and operatively associated with said lever for the purpose described, said casing having means for removably attaching it beneath the supporting spring adjacent the end of the latter.

6. In a vehicle, a leaf spring, a body element supported thereby, and a shock neutralizer interposed between said leaf spring and body, said neutralizer comprising a casing, a coiled spring therein, an abutment member bearing against one end of said spring and sliding in said casing, and a lever fulcrumed on said casing and operatively connected to said abutment member to actuate the latter on flexion of the leaf spring, said casing having means for removably attaching it beneath the supporting spring adjacent the end of the latter.

7. For use with a vehicle having a body part and a supporting spring therefor associated with the running gear, said body part and spring being separable at their ends, a self-contained shock neutralizer adapted to be operatively interposed between said ends and comprising a casing having means for removably attaching it beneath the supporting spring adjacent its end, neutralizer spring means in the casing, a lever fulcrumed on the casing and pivotally connected to the body part, together with means pivoted to the lever and operatively associated with the neutralizer spring means in such manner that relative vertical displacement of said ends will be yieldingly resisted.

Signed at New York, in the county of New York and State of N. Y., this 26th day of October, A. D. 1914.

RICHARD T. NEWTON.

Witness:
C. A. O. ROSELL.